United States Patent
Hukkanen

(10) Patent No.: US 9,738,321 B2
(45) Date of Patent: Aug. 22, 2017

(54) ARRANGEMENT AND METHOD FOR ENABLING ROTATION MOVEMENT BETWEEN TANDEM OR CATERPILLAR AXLE AND BODY OF VEHICLE

(71) Applicant: PONSSE OYJ, Vieremä (FI)

(72) Inventor: Pentti Hukkanen, Kiuruvesi (FI)

(73) Assignee: PONSSE OYJ, Vieremä (FI)

( * ) Notice: Subject to any disclaimer, the term of this patent is extended or adjusted under 35 U.S.C. 154(b) by 0 days.

(21) Appl. No.: 14/895,414

(22) PCT Filed: Jun. 3, 2014

(86) PCT No.: PCT/FI2014/050444
§ 371 (c)(1),
(2) Date: Dec. 2, 2015

(87) PCT Pub. No.: WO2014/195577
PCT Pub. Date: Dec. 11, 2014

(65) Prior Publication Data
US 2016/0114833 A1    Apr. 28, 2016

(30) Foreign Application Priority Data
Jun. 3, 2013    (FI) ...................... 20135615

(51) Int. Cl.
*B62D 37/00*    (2006.01)
*B62D 53/02*    (2006.01)
(Continued)

(52) U.S. Cl.
CPC ............. *B62D 21/186* (2013.01); *B60G 5/02* (2013.01); *B60G 99/002* (2013.01); *B60P 3/41* (2013.01);
(Continued)

(58) Field of Classification Search
CPC ...... B62D 53/02; B62D 49/08; B62D 33/063; B62D 33/067; B62D 37/00;
(Continued)

(56) References Cited

U.S. PATENT DOCUMENTS 3,414,072 A    12/1968 Hodges, Jr. et al.
3,805,908 A    4/1974 Thompson
(Continued)

FOREIGN PATENT DOCUMENTS

DE    2011799 A1    10/1970
FI    WO 02098720 A1 *    12/2002    ......... B62D 33/0608
(Continued)

*Primary Examiner* — Keith Frisby
(74) *Attorney, Agent, or Firm* — Birch, Stewart, Kolasch & Birch, LLP

(57) ABSTRACT

An arrangement and method are provided for enabling rotation movement between a tandem or caterpillar axle and a body of a vehicle. This type of vehicle includes at least one body part that is provided with a tandem or caterpillar axle. At least one body part includes a main body and an auxiliary body connected to it to rotate around the longitudinal axis of the vehicle or an essentially parallel axis thereto. The tandem or caterpillar axle is connected substantially rigidly to the main body, and the body part has at least one actuator for controlling the rotation movement between the main body and auxiliary body. In this way, changes in the position and motion status of the auxiliary body, especially in relation to the rotation around the longitudinal axis of the vehicle, are arranged to cause in the actuator a pushing or pulling motion that steers the auxiliary body to a rotation movement for the purpose of arranging the auxiliary body to a substantially horizontal position.

5 Claims, 4 Drawing Sheets

(51) Int. Cl.
*B60P 3/41* (2006.01)
*B62D 21/18* (2006.01)
*B60G 5/02* (2006.01)
*B62D 21/11* (2006.01)
*B60G 99/00* (2010.01)
*A01G 23/00* (2006.01)

(52) U.S. Cl.
CPC .............. *B62D 21/11* (2013.01); *B62D 37/00* (2013.01); *B62D 53/02* (2013.01); *A01G 23/00* (2013.01); *B60G 2300/07* (2013.01); *B60G 2300/08* (2013.01); *B60G 2300/09* (2013.01); *B60G 2800/0194* (2013.01); *B60Y 2200/417* (2013.01)

(58) Field of Classification Search
CPC ............ B62D 55/0655; B60G 2300/07; B60G 2200/315; B60G 2200/314; B60G 2800/0194; E02F 9/0841; E02F 9/2257; A01G 23/00; B60P 1/045; B60P 3/40; B60P 3/41; A01D 75/28; B60Y 2200/417; B60Y 2200/44

USPC .... 280/5.509, 6.154, 493, 492, 400; 180/41, 180/235, 89.14, 89.15
See application file for complete search history.

(56) References Cited

U.S. PATENT DOCUMENTS

| | | | |
|---|---|---|---|
| 3,976,302 A * | 8/1976 | Hammarstrand | B60G 9/02 180/41 |
| 4,991,673 A | 2/1991 | Ericsson | |
| 5,632,350 A * | 5/1997 | Gauvin | B60D 1/00 180/14.4 |
| 2004/0124600 A1 | 7/2004 | Maloy | |
| 2006/0131837 A1 | 6/2006 | Zanini | |

FOREIGN PATENT DOCUMENTS

| | | |
|---|---|---|
| GB | 1267773 A | 3/1972 |
| WO | WO 96/34776 A1 | 11/1996 |
| WO | WO 2012/113981 A1 | 8/2012 |
| WO | WO 2013/026951 A1 | 2/2013 |

* cited by examiner

ARRANGEMENT AND METHOD FOR ENABLING ROTATION MOVEMENT BETWEEN TANDEM OR CATERPILLAR AXLE AND BODY OF VEHICLE

BACKGROUND OF THE INVENTION

The present invention relates to an arrangement for enabling rotation movement between the tandem or caterpillar axle and body of a vehicle.

One significant field of application for this type of solution is a stabilization system for stabilizing the lateral roll of the cabin of a vehicle with articulated steering, for instance. One vehicle group of this type is found in forest machines, the drivers of which often are, due to their working conditions in a swaying vehicle, the recipients of a lot of low-frequency (0.5 to 10 Hz) vibration with a randomly varying amplitude that has been found hazardous to health. The ill effects of such a vibration to the driver are tiredness, lower work efficiency, and stress directed to the musculoskeletal system and spine; especially the lower back. The effect of this vibration on a person's health has been discussed by Griffin (1990) and Dupruis & Zerlett (1986), among others. In the case of a forest machine and especially a forwarder, the crosswise movements, or lateral sway, in relation to the longitudinal axis of the machine are known to be the most hazardous. The sways are typically caused by a wheel or caterpillar of the forwarder on one side going over a high obstacle, such as rock or stump. These sways are typically the stronger, the more uneven the terrain is and the higher the velocity of the vehicle is.

The swaying of the vehicle affects not only the comfort of the driver, but also the stability of the vehicle and especially the terrain-friendliness of the forest machine. By damping the sways, it is possible to increase the velocity of the vehicle, which affects directly the output of the vehicle.

The above-mentioned drawbacks have been solved in different ways in the present forest machines, for example. A simple way is to replace a two-wheel axle with a specific rocker tandem axle that due to the gearing effect between the wheels evens out the sway of the vehicle to some extent, since the rocker tandem axle tends to substantially halve the sway caused by an obstacle. On the other hand, this solution leads to getting two smaller sways instead of just the one depending on the size and shape of the obstacle, which is not welcome as such. Accelerations directed to the driver may also be reduced by using an active suspension developed by the car industry, for example. However, this type of active suspension does not eliminate the low-frequency lateral sways that are directed to the cabin, in particular, and that are the most hazardous to health according to studies.

Forest machines mostly have a two-body structure, in which case the front and rear parts are connected to each other by a joint with two degrees of freedom that makes the steering of the machine possible and conventionally also permits these body parts to rotate in relation to each other, if the axles of both parts are fixed stationary to the body parts. Another conventional arrangement is to arrange the axle of one body to be a rocker axle, if a degree of freedom permitting the rotation of the bodies substantially in relation to the longitudinal axis of the machine has not been implemented in the joint between the bodies of the machine.

In mechanical power transmission, both ordinary and rocker tandem axles are generally used. Rocker tandem axles are usually fixed to the body. A tandem axle distributes the attractive force and surface pressure more evenly to the terrain and evens out the sway to some extent. In any case, a tandem axle typically allows for a better advancement in slope terrain and in poorly bearing terrain conditions due to a larger contact surface and lower surface pressure. By means of the tandem axles, the centre of gravity of the machine can also be made lower without essentially compromising the ground clearance, and this affects advantageously to the stability of the machine. Ordinary two-wheel axles can be fastened both fixedly and in an articulated manner to the body, i.e. as a swing axle. The second axle is usually a fixed one, while the other swings.

In published patent EP 0 824 413, the swinging movements of the vehicle cabin is controlled by a device, in which an axle that substantially swings in relation to the longitudinal axis of the vehicle is arranged to the front body that is arranged rotatingly to the rear body. The front body also has at least one actuator for controlling this swing axle. The shift of the centre of gravity of the front body in a transverse direction to the longitudinal axis of the front body causes in the actuator a push or pull movement that evens out the shift of the centre of gravity, until balance is achieved in the actuator and the front body is in a substantially horizontal position. This way, the lateral roll of the front body caused by the unevenness of the terrain can be reduced or eliminated entirely. The mass to be moved by this type of device is relatively small, so the need for hydraulic power required in the device is not unreasonably high.

The device described above works well when controlling a swing axle, but it cannot be applied as such to controlling wheels installed on a tandem axle. Because the use of tandem axles in forest machines continues to grow, the control of the swaying movements related to them has also become more important than before.

Known solutions do enable keeping the driver in the cabin that is orientated to be continuously substantially horizontal. However, when the stabilizing axle is located high, it is not possible to avoid a lateral translation movement, which is caused by the above-mentioned lateral swing or roll, acting on the driver. This is a problem in several known stabilizing arrangements for forest machine cabins.

BRIEF DESCRIPTION OF THE INVENTION

It is, thus, an object of the invention to provide an arrangement and method for avoiding the above-mentioned problems at least mainly. This object is achieved in such a manner that the arrangement and method for enabling rotation movement between a tandem or caterpillar axle and the body of a vehicle have the characteristics defined in the claims in accordance with this invention.

Preferred embodiments of the invention are disclosed in the dependent claims.

When making a rotation movement of a cabin or other part of a vehicle possible in relation to the main body of the vehicle, it is advantageous to position the rotation axis of such a part as close as possible to the surface of the terrain that the vehicle is travelling, in which case the strength of the lateral sway of the vehicle can also be minimized. In other words, the rotation acting on the driver can be dampened and even eliminated entirely also in relation to a high-positioned stabilizing axle. The solution is quite simple to implement, when the vehicle has a swing axle controlling the wheel pair. In a machine equipped with a tandem or caterpillar axle, the solution to the problem is clearly more challenging. In theory, it is possible to apply a similar solution to the vehicle by replacing the swing axle with a novel type of rocker tandem axle. This type of rocker tandem axle could then be applied to swing in relation to the longitudinal axis of the vehicle and simultaneously to the main body of the vehicle. However, the joint construction of such a rocker tandem axle would become large and expensive due to its requirements. The expensiveness of the structure is explained by the fact that due to its four contact points to the surface of the terrain, which are relatively far apart from each other, a rocker tandem axle would cause considerably higher forces to the body structures than a more conventional two-wheel swing axis that does not break the ground in the lateral direction when steering a vehicle with articulated steering. This phenomenon is especially emphasized in vehicles with articulated steering, such as forest machines.

Due to its large structure, the main dimensions and weight of the machine would also increase, which would weaken the operating and transport properties of the vehicle.

In the present solution, these problems have been avoided by providing the vehicle with a separate auxiliary body. This auxiliary body is, in turn, articulated substantially concentrically to the main body of the vehicle that has an ordinary tandem or caterpillar axle equipped with differential gear. When applying the solution to a vehicle with articulated steering, the main body thus connects in a known manner the steering joint of the vehicle with articulated steering and the tandem or caterpillar axle rigidly arranged to the main body. Thus, stress is transmitted from the steering joint to the bolt fastening of the tandem or caterpillar axle as before without needing to have a heavy bearing system in between, like a swinging tandem or caterpillar axle would require.

Because the solution of the invention does not need to separately articulate the rocker tandem axle to the vehicle body that bears the forces generated from the terrain and power transmission, it is also mainly possible to prevent increase in the dead weight of the vehicle. At the same time, it has been possible to keep the articulation mechanics of the vehicle as simple as possible, and the hydraulics or steering of the vehicle does not become substantially more complex than before.

When mounting a cabin on a movable auxiliary body, the heating, ventilation and control device cabling and tubes between the cabin and auxiliary body cannot be damaged by the continuous friction directed to them in conventional anti-roll and stabilization solutions of the cabin. Thus, the operational reliability of the vehicle is much improved in comparison with a structure that is capable of adjusting just the horizontal position of the cabin.

The invention also provides other considerable advantages. Therefore, in addition to improving the comfort and ergonomics of the driver, the vehicle can be driven at a higher speed, which improves its productivity. For instance, the ability to go over a significantly high and so-called "short" obstacle, such as a rock or stump in the terrain, is clearly better than in the prior-art solutions, because the auxiliary body supporting the cabin in relation to the main body, or some other auxiliary body placed on this main body can be kept in a straighter position than before. When being able to utilize the tandem axle structure in both the front and read body of the vehicle, the surface pressures of the wheel are distributed more evenly than before on the base, whereby the terrain and root system damages caused otherwise by a forest machine are reduced while it is easier to move on a soft base. Correspondingly, peak load directed on an individual tandem or caterpillar axle system half (the wheel pair of the tandem or caterpillar axle system on the same side of the machine) can be reduced, while the load is distributed more evenly on all wheels of the machine.

When applying the present solution to a forest machine, a high forest machine used on a thinning site, for instance, and especially a cargo space loaded high on top of the forest machine, can be driven through even a narrow logging road without damaging the trees on the side of the road. This is possible, because the body of the vehicle can be kept in a substantially vertical position better than before. This way, it is possible to avoid damage caused by the lateral roll to the surrounding trees.

In addition, stress to the body and axles of the vehicle is reduced, thus also reducing the need for maintenance and repair.

Other advantages of the invention are disclosed in the following, where specific embodiments of the invention are described in more detail.

BRIEF DESCRIPTION OF THE DRAWINGS

In the following, some preferred embodiments of the invention will be explained in more detail with reference to the accompanying drawing, in which.

DETAILED DESCRIPTION OF PREFERRED EMBODIMENTS

Figure 1:
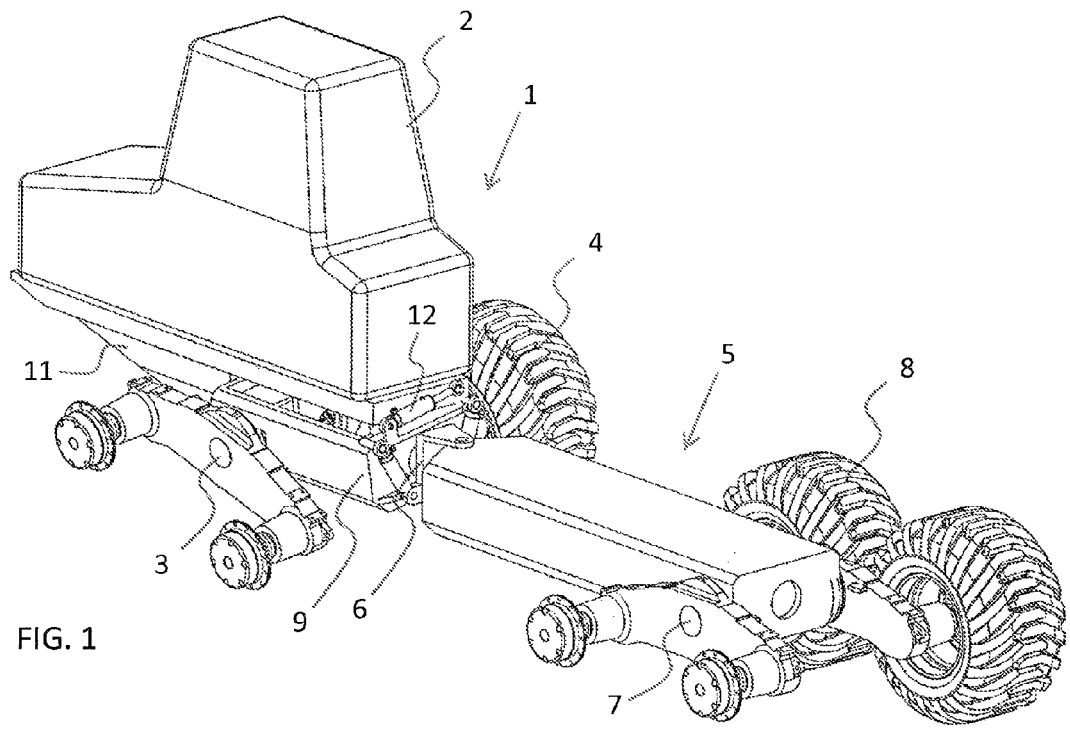
FIG. 1 shows a schematic axonometric figure of arranging the present body structure into a forest machine.

The present figures do not show the arrangement for enabling rotation movement between a tandem or caterpillar axle and the body of a vehicle in scale but the figures are schematic, illustrating the structure and operation of the preferred embodiments in principle. Structural parts indicated by reference numerals in the accompanying figures then correspond to structural parts provided with reference numerals in this specification.

In the following, the structure and operation of the present arrangement is expressed in a forest machine environment. Even though the embodiment shown is a forest machine with articulated steering, the present arrangement is not restricted to this operating environment, but can also be utilized in other vehicles, both in one- and multi-body vehicles, whether they are provided with articulated steering or not.

As can be seen in FIG. 1, a preferred embodiment of the arrangement for a vehicle comprises a forest machine, of which the figure shows a front body 1 and a cabin 2 arranged on the front body. The front body is provided with a tandem axle 3 extending to both sides thereof with only the right-hand-side tandem axle in its traveling direction equipped with wheels 4. A rear body 5 is connected to the front body with a body joint 6 of two degrees of freedom. The rear body is also provided with a tandem axle 7 extending to both sides thereof with only the right-hand-side tandem axle in its traveling direction equipped with wheels 8 in the figure. The joint connecting the front and rear bodies permits in a manner known per se both the rotation of the front and rear bodies essentially in relation to the longitudinal axis of the vehicle (a rotating joint enabling adaptation to the shape of the terrain) and the rotation of the front and rear bodies in relation to each other and the vertical axis intersecting the joint (articulated steering joint).

Even though the solution is described in the following with reference to a tandem axle with wheels, the present arrangement can also be implemented with an axle that instead of a tandem axle with wheels is provided with caterpillars on the opposite sides of the body, for instance. This type of tandem or caterpillar axle preferably swings, but the operational idea disclosed in the following can also be implemented in a non-swinging tandem or caterpillar axle.

At least one of the front body 1 or rear body 5 is formed of a main body 9 and an auxiliary body 11 connected to it to rotate laterally in relation to the longitudinal axis 10 of the vehicle or an essentially parallel axis. The longitudinal axis refers herein to an axis that is substantially parallel to the driving direction of the vehicle. As the front and rear bodies of the vehicle are preferably provided with tandem axles 3 and 7 and with preferably swinging wheel axles, at least one of these tandem axles are connected substantially rigidly to a main body 9 of said type. The body in question then also has at least one actuator 12 to control the rotation movement between the main body and auxiliary body. The lateral sway acting on the cabin 2 and the changes in motion status caused by them as well as positional changes taking place in view of the acceleration vector caused by earth gravity initiate in the actuator 12 a pulling movement to compensate for this positional change.

Thanks to this rotational movement, the auxiliary body can be arranged to remain substantially horizontal and the lateral roll of the auxiliary body caused by the unevenness of the terrain to the vehicle can be reduced or eliminated. Herein, the horizontal position refers to a normal orientation of a space, in which the bottom surface of the space—in this case, the floor of the cabin, for example—is essentially horizontal and the driver driving the vehicle in the cabin sits in an essentially upright position.

Figure 2:
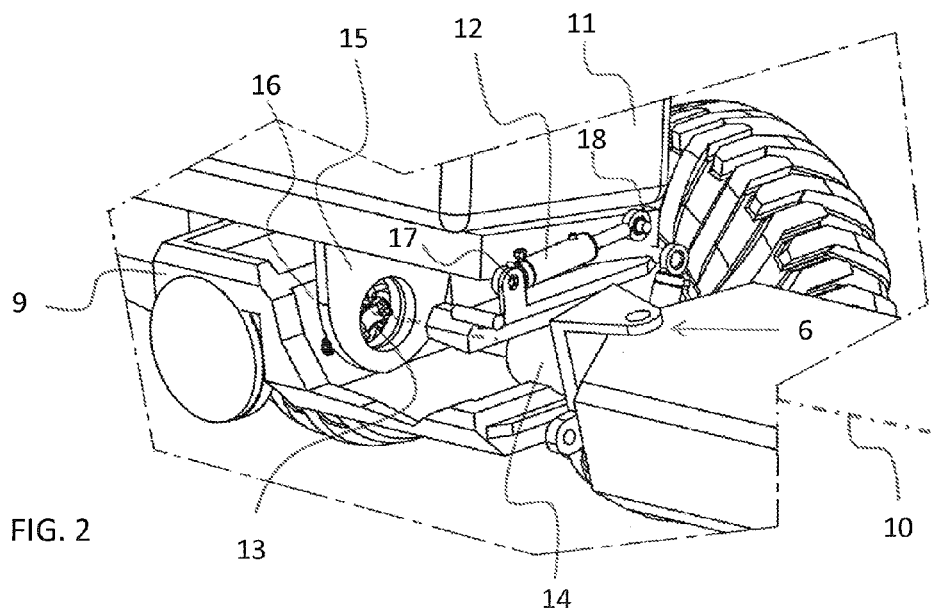
FIG. 2 shows a partly cut detail view of the front body structure of the forest machine according to FIG. 1.
Figure 3:
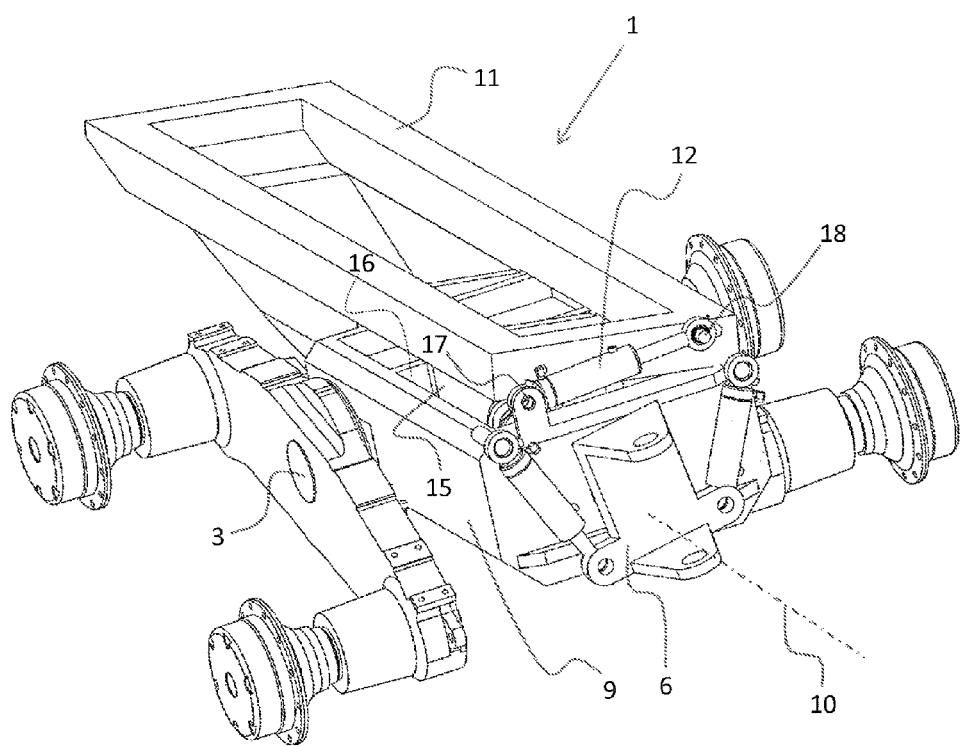
FIG. 3 is a schematic representation of how the auxiliary body and main body are joined together.

FIGS. 2 and 3, for instance, show in more detail the main body 9 forming the front and/or rear body and the auxiliary body 11 that rotates in relation to the longitudinal axis 10 of the vehicle or an essentially parallel axis. As indicated by the embodiment shown in the figures, the auxiliary body should preferably be connected to the main body by a rotating joint, which in the figures is formed by at least two bearing systems 13 and 14, to provide sufficient structural rigidity. Further, it is advantageous to arrange the rotation axis of the rotating joints to be substantially congruent with the rotation axis of the body joint 6 that permits the rotation of the front and rear bodies in relation to the longitudinal axis of the vehicle. The rotation axis of this rotating joint is represented herein by the longitudinal axis 10 of the main body marked in FIGS. 2 and 3. At its simplest, the rotating joint can be provided by using the body joint 6 that allows the rotation of the front and rear bodies in relation to the longitudinal axis of the vehicle as the second bearing system 14, as shown in FIG. 2.

In the embodiment of FIG. 3, the auxiliary body 11 is arranged to the main body 9 via substantially parallel crosswise structures in them. Thus, at least two flanges 15 extend from the auxiliary body against the crosswise walls 16 in the main body; the figure showing only the front pair of the walls. The crosswise walls and flanges are attached to each other by bearings that are preferably at a slight distance from each other in the direction of the longitudinal axis of the vehicle to permit their relative rotation in relation to the longitudinal axis 10.

In its simplest form, the actuator 12 controlling the relative rotation of the main body 9 and auxiliary body 11 comprises a hydraulic or pneumatic actuator connected to opposite lugs 17 and 18 in two body parts, as shown in FIG. 2. However, nothing prevents the use of a linear motor or some other actuator capable of sufficiently fast movement combined with a suitable transmission or operating mechanics.

In an embodiment, where both tandem or caterpillar axles 3 and 7 in the vehicle are connected to a main body 9 and 9b in the body 1 and 5 receiving the tandem or caterpillar axle, both auxiliary bodies 11 and 11b are also arranged to rotate in relation to the longitudinal axis 10 of the vehicle or an axis substantially parallel to it. This type of vehicle preferably has two control systems for the actuator 12 and 12b independent of each other. The first control system controls the lateral roll between the main and auxiliary bodies in the front body 1, for instance. The second control system controls the lateral roll between the main and auxiliary bodies in the rear body 5, for instance. This type of control system controlling the operation of a rear body actuator is at the same time preferably in cooperation with the control system of the body joint 6 that connects the front and rear bodies of the vehicle.

Figure 6:
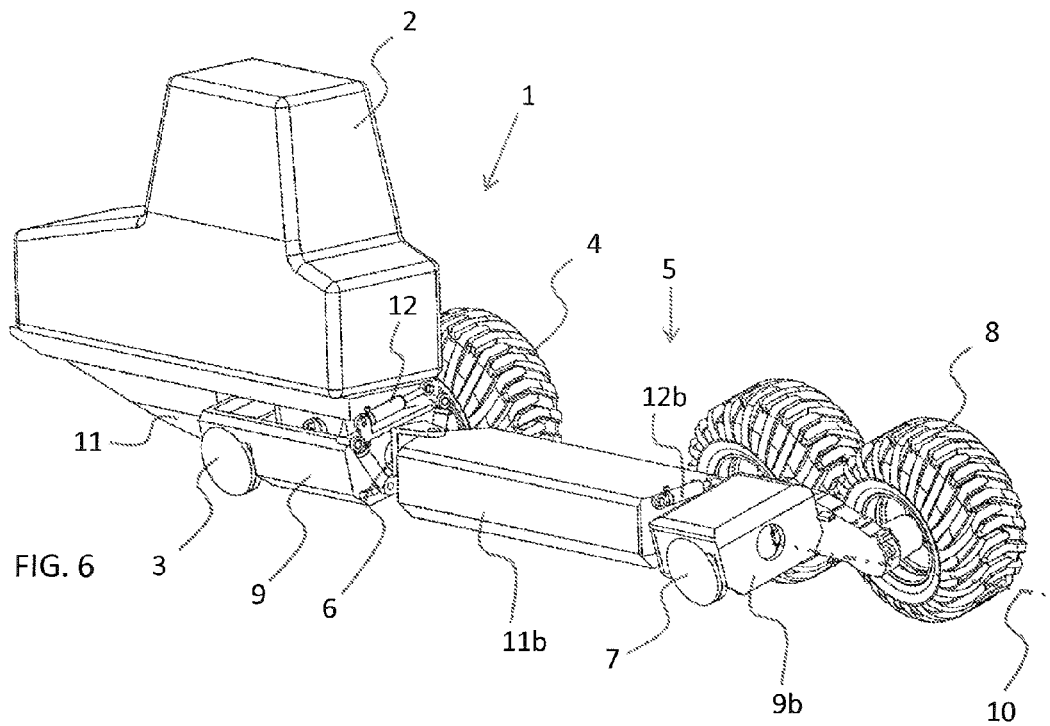
FIG. 6 shows an alternative embodiment of the body structure.
Figure 7:
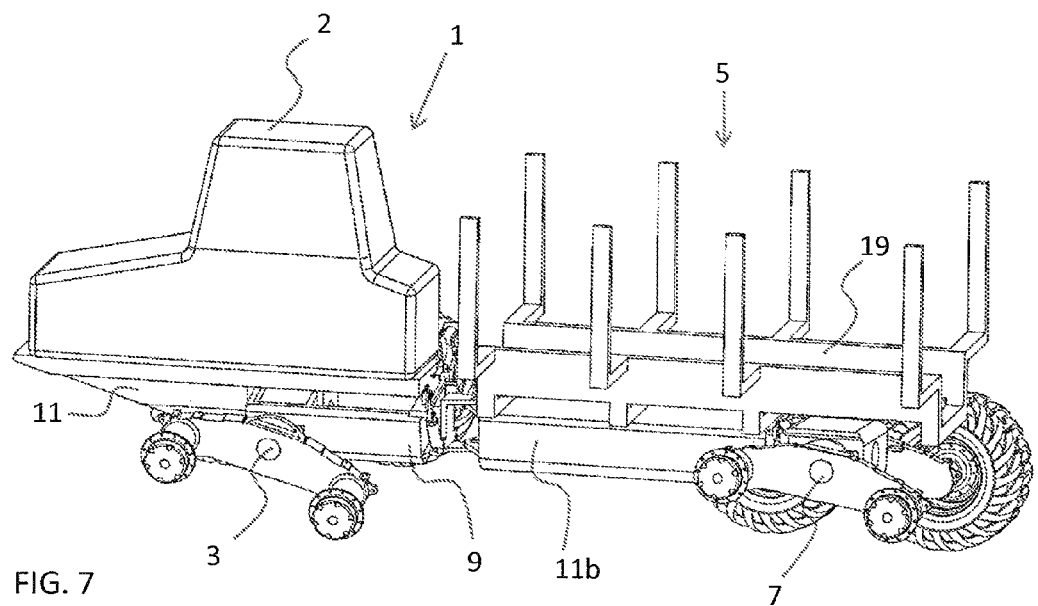
FIG. 7 shows a cargo space to be mounted on the auxiliary body according to FIG. 6.

This last-mentioned embodiment is shown in FIGS. 6 and 7. In this embodiment, the auxiliary body 11b fitted with bearings to the main body 9b is at its opposite end fitted with bearings to the front body via the body joint 6, which at the same time forms the second bearing system of the rotating joint required in the system. In accordance with FIG. 7, a cargo space 19 of the forest machine is arranged substantially rigidly to the auxiliary body, which means that maintaining the horizontal position of the cargo space during driving can be arranged to take place using both the actuators controlling the operation of the body joint and the actuator in connection with the main body 9b.

Figure 4:
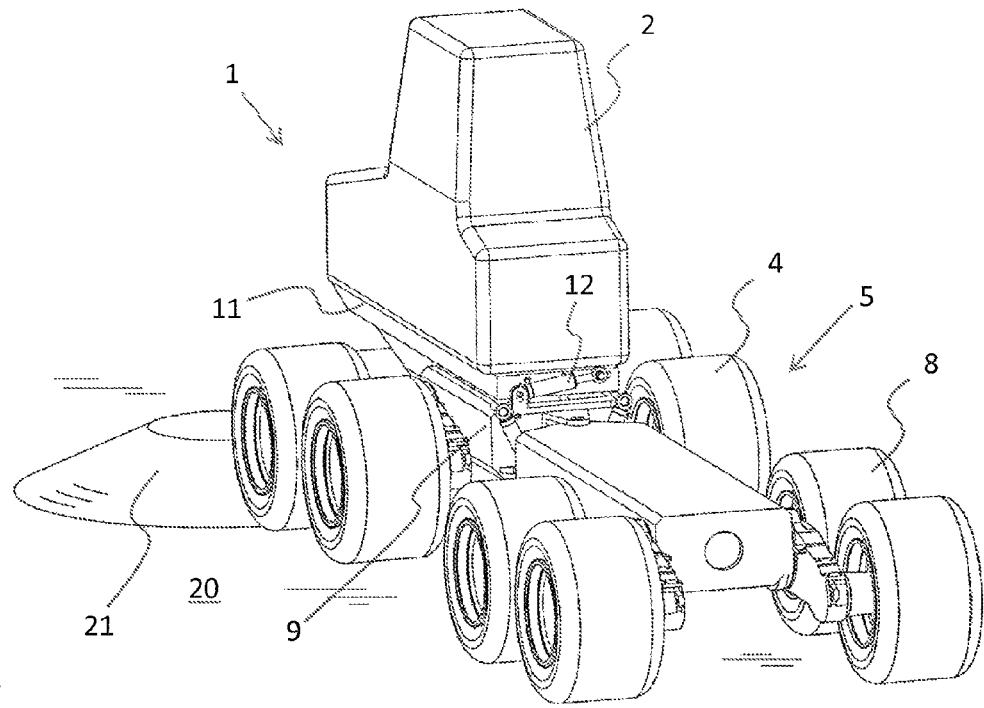
FIGS. 4 and 5 show how the present arrangement behaves when going over an obstacle.
Figure 5:
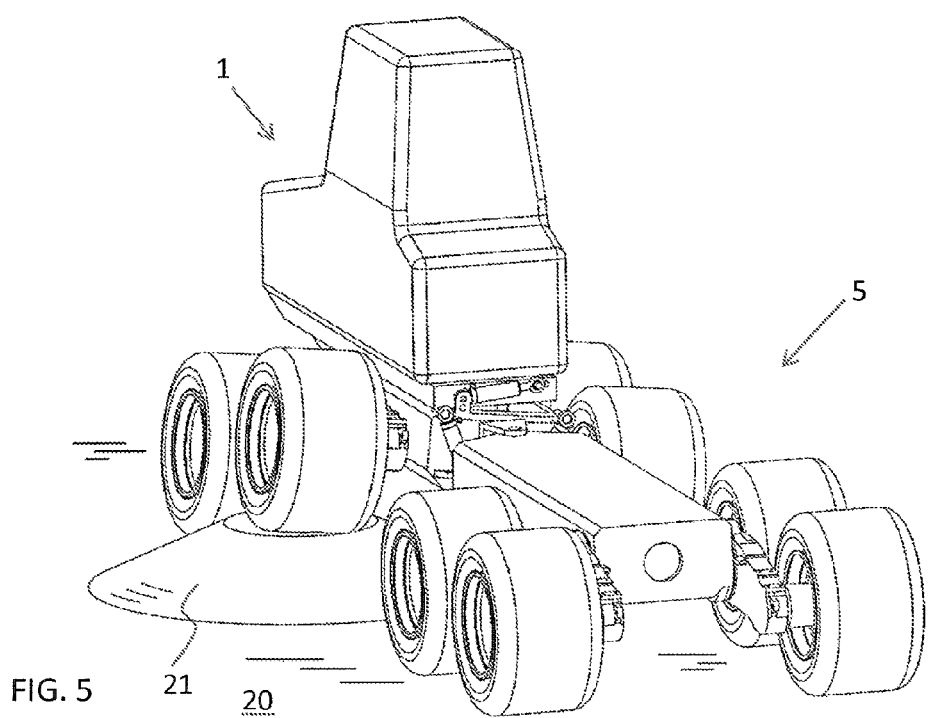

FIGS. 4 and 5 express the operation of the present arrangement and method. Thus, in FIG. 4, the vehicle approaches an obstacle that rises vertically from the surrounding terrain 20 and is located on one side of the vehicle. As shown in FIG. 5, the left-hand-side wheel tandem axle of the vehicle begins to go over the obstacle 21 by evening with a swinging motion the lateral sway caused by the obstacle and directed, among other things, to the cabin 2. At the same time, the control system and the sensors controlling its operation in the vehicle detect a change in the motion status in the vehicle and especially a positional change taking place in view of the acceleration vector caused by earth gravity, and initiate a pulling movement in the actuator 12 to compensate for the positional change.

The auxiliary body 11 is generally kept horizontal in the sideward direction and the angular velocity of the rotation around the longitudinal axis of the auxiliary body at zero. In some situations, it may also be preferable to tilt the auxiliary body temporarily, if this improves the compensation of the lateral sway. This can be done for example in situations, where the mechanical play of the controlled joint or actuator prevents a complete correction of the lateral roll to the horizontal, but the compensation of the lateral sway should be possible in both directions.

The pulling movement of the actuator 12 causes in the auxiliary body 11 supporting the cabin 2 a rotation around the longitudinal axis 10, with which the otherwise harmful lateral sway is quickly and energy-efficiently compensated for. When the system works sufficiently quickly and appropriately, said auxiliary body 11 can preferably be kept substantially stationary at least in relation to axes parallel to the longitudinal axis 10 against rotation, and the main body 9 articulated below the auxiliary body 11 with its tandem axles moves in accordance with the shape of the terrain.

It is obvious to a person skilled in the art that, as technology advances, the basic idea of the described solution may be implemented in various ways. The disclosed invention and its embodiments are thus not restricted to the above examples but may vary within the scope of the claims.

Thus, the present arrangement may, in accordance with what is stated above, comprise a vehicle with just one body part 1 provided With a tandem axle 3 or caterpillar axle. This type of body part comprises a main body 9 and an auxiliary body 11 connected thereto to rotate in relation to the longitudinal axis in the main direction of travel of the vehicle, whereby a tandem or caterpillar axle is connected substantially rigidly to the main body.

By providing the body part 1 with at least one actuator 12 located between the main body 9 and auxiliary body 11, it is possible to manage the relative rotation movement of the main body and auxiliary body in a controlled manner. This type of control takes place when forces are directed to the vehicle, which act in a direction transverse to the longitudinal axis of the vehicle. Thus, the position of the auxiliary body kept horizontal to earth gravity (horizontal plane) can for example be measured with inertia sensors known per se, such as an inclinometer, gyroscope, various one- or multi-axle acceleration sensors or a combination of one or more of the above. At the same time, it is also advantageous to monitor the angular velocity and angular acceleration of the auxiliary body at each time with a gyroscope, for example. On the basis of the measuring data, a pushing or pulling movement is achieved in the actuator 12 to steer the auxiliary body to rotate in relation to the main body so as to maintain the substantially horizontal position of the auxiliary body. To ensure that an appropriate pushing or pulling movement is achieved, it is also possible to measure the rotational angle between the main and auxiliary bodies.

Preferably, it is possible to arrange and integrate said sensors as parts of a control module of an embedded control system known per se, inside said control module and in its immediate vicinity.

In a preferred embodiment, the auxiliary body 11 is arranged to the main body 9 by a rotating joint, which may comprise at least two concentric bearing systems, for instance, at a distance from each other in the direction of the rotation axis.

The invention claimed is:

1. An arrangement for enabling rotation movement between a tandem or caterpillar axle and a body of a vehicle, wherein
    the vehicle comprises at least two body parts connected to each other by a body joint,
    a body part is provided with a tandem or caterpillar axle,
    at least one body part comprises a main body and an auxiliary body connected to it to rotate around the longitudinal axis of the vehicle or an essentially parallel axis thereto, whereby
    the auxiliary body is arranged to the main body with a rotating joint, and
    the tandem or caterpillar axle is connected substantially rigidly to said main body, and
    the body part has at least one actuator to control the relative rotation movement of the main body and auxiliary body in such a manner that changes in the position and motion status of the auxiliary body especially in relation to the rotation around the longitudinal axis of the vehicle are arranged to cause in the actuator a pushing or pulling motion that steers the auxiliary body to a rotation movement for the purpose of arranging the auxiliary body to a substantially horizontal position,
    wherein the auxiliary body is arranged to the main body via substantially parallel crosswise structures in them such that at least two flanges extend from the auxiliary body against crosswise walls in the main body,
    wherein said crosswise walls and flanges are attached to each other by bearing systems forming rotating joints, whereby
    wherein the bearing systems are at a distance from each other in the direction of the longitudinal axis of the vehicle to permit their relative rotation in relation to this longitudinal axis, and
    wherein the rotation axis of the rotating joint is arranged to be substantially congruent with the rotation axis of the body joint.

2. The arrangement as claimed in claim 1, wherein the vehicle comprises a front body and a rear body connected to each other with a body joint having at least two degrees of freedom, the joint allowing the rotation of the front and rear bodies substantially in relation to the longitudinal axis of the vehicle and the rotation of the front and rear bodies in relation to each other and a vertical axis intersecting the body joint.

3. The arrangement as claimed in claim 2, wherein both the front and rear bodies are each provided with tandem axles or caterpillar axles.

4. The arrangement as claimed in claim 3, wherein the front and rear bodies are each provided with a main body, and the tandem axles or caterpillar axles of the vehicle are connected to the main body of the front body and the rear body.

5. A method for enabling rotation movement between a tandem or caterpillar axle and a body of a vehicle, comprising:
    forming the vehicle of at least two body parts connected to each other by a body joint, hereby
    providing a body part with a tandem or caterpillar axle, and
    forming at least one body part of a main body and an auxiliary body that is connected rotatably thereto, and the auxiliary body is rotatable in the transverse direction to the longitudinal axis of the vehicle, and
    arranging the auxiliary body to the main body with a rotating joint, and
    connecting the tandem axle to the main body substantially rigidly;
    providing the body part with at least one actuator for controlling the relative rotation movement of the main body and auxiliary body in such a manner that
    changes in the position and motion status of the auxiliary body especially in relation to the rotation around the longitudinal axis of the vehicle cause in the actuator a pushing or pulling motion that steers the auxiliary body to a rotation movement,
    the actuator movement steering the auxiliary body to a substantially horizontal position,
    wherein the auxiliary body is arranged to the main body via substantially parallel crosswise structures in them such that at least two flanges are extended from the auxiliary body against crosswise walls in the main body,
    wherein said crosswise walls and flanges are attached to each other by bearing systems forming rotating joints, wherein the bearing systems are set at a distance from each other in the direction of the longitudinal axis of the vehicle thus permitting their relative rotation in relation to this longitudinal axis, and wherein the rotation axis of the rotating joint is arranged to be substantially congruent with the rotation axis of the body joint.

\* \* \* \* \*